(12) United States Patent
Rozman et al.

(10) Patent No.: US 9,969,273 B2
(45) Date of Patent: May 15, 2018

(54) INTEGRATED MODULAR ELECTRIC POWER SYSTEM FOR A VEHICLE

(71) Applicant: Hamilton Sundstrand Corporation, Charlotte, NC (US)

(72) Inventors: Gregory I. Rozman, Rockford, IL (US); Steven J. Moss, Rockford, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 148 days.

(21) Appl. No.: 15/207,901

(22) Filed: Jul. 12, 2016

(65) Prior Publication Data

US 2018/0015831 A1 Jan. 18, 2018

(51) Int. Cl.
*B60L 11/12* (2006.01)
*B60L 11/18* (2006.01)
(Continued)

(52) U.S. Cl.
CPC .............. *B60L 11/02* (2013.01); *B60L 11/12* (2013.01); *B60L 11/1809* (2013.01);
(Continued)

(58) Field of Classification Search
CPC ...... B60L 11/02; B60L 11/12; B60L 11/1809; B60R 16/03; H02J 1/10; H02J 2001/008;
(Continued)

(56) References Cited

U.S. PATENT DOCUMENTS

| 7,057,376 B2 | 6/2006 | Cook et al. |
| 8,358,111 B2 | 1/2013 | Rozman et al. |

(Continued)

FOREIGN PATENT DOCUMENTS

| CN | 104158212 | 11/2014 |
| CN | 104269875 | 1/2015 |

(Continued)

OTHER PUBLICATIONS

Khomfoi, Surin and Leon M. Tolbert, Chapter 31 Multilevel Power Converters, The University of Tennessee, pp. 31-1-31-50, 2007.

(Continued)

*Primary Examiner* — Levi Gannon
(74) *Attorney, Agent, or Firm* — Carlson, Gaskey & Olds, P.C.

(57) ABSTRACT

A power system architecture for a vehicle includes a source management unit having at least a generator, a first stored energy component, and a second stored energy component. A high voltage DC bus connects a high voltage load to the source management unit. At least one low voltage DC bus connects at least one low voltage DC load to the source management unit. The source management unit includes a plurality of multi-functional power modules configured such that the source management unit includes a multi-level active rectifier connecting the generator to a multi-level DC bus, a first multi-level multi-function converter connecting the first stored energy component to the multi-level active rectifier, a second multi-level multi-function converter connecting the second stored energy component to a multi-level isolated DC bus, and an isolated multi-level DC-DC converter connecting the multi-level DC bus to the multi-level isolated DC bus.

18 Claims, 8 Drawing Sheets

(51) Int. Cl.
  *B60R 16/03* (2006.01)
  *H02J 1/10* (2006.01)
  *B60L 11/02* (2006.01)
  *H02M 7/04* (2006.01)
  *H02M 3/04* (2006.01)
  *H02M 3/335* (2006.01)

(52) U.S. Cl.
  CPC ............... *B60R 16/03* (2013.01); *H02J 1/10* (2013.01); *H02M 3/04* (2013.01); *H02M 3/33507* (2013.01); *H02M 7/04* (2013.01)

(58) Field of Classification Search
  CPC .... H02J 3/38; H02J 7/04; H02M 3/04; H02M 3/33507
  See application file for complete search history.

(56) References Cited

U.S. PATENT DOCUMENTS

| | | | |
|---|---|---|---|
| 8,738,268 B2 | 5/2014 | Karimi et al. | |
| 8,816,641 B2 | 8/2014 | Andrea et al. | |
| 8,829,723 B2 | 9/2014 | Graovac et al. | |
| 9,088,230 B2 | 7/2015 | Rozman et al. | |
| 9,118,206 B2 | 8/2015 | Peterson et al. | |
| 9,193,273 B1 | 11/2015 | Frank et al. | |
| 9,731,609 B2* | 8/2017 | Ambrosio | B60L 11/1803 |
| 9,868,409 B2* | 1/2018 | Cook | B60R 16/033 |
| 2002/0190695 A1* | 12/2002 | Wall | H02J 1/10 322/17 |
| 2010/0276993 A1* | 11/2010 | King | B60L 11/12 307/9.1 |
| 2011/0121769 A1* | 5/2011 | Rozman | B60L 11/1811 318/400.27 |
| 2013/0049648 A1* | 2/2013 | Rozman | B60R 16/03 318/139 |
| 2015/0180252 A1* | 6/2015 | Stempin | H02J 7/0042 320/103 |

FOREIGN PATENT DOCUMENTS

| | | |
|---|---|---|
| EP | 2815913 | 12/2014 |
| WO | 2014026840 | 2/2014 |

OTHER PUBLICATIONS

European Search Report for Application No. 17174627.4 dated Mar. 19, 2018.

* cited by examiner

INTEGRATED MODULAR ELECTRIC POWER SYSTEM FOR A VEHICLE

TECHNICAL FIELD

The present disclosure relates generally to vehicular power systems, and more specifically to an integrated modular electric power system for a vehicle.

BACKGROUND

Certain ground vehicles, such as those utilized in military and similar applications, use hybrid electric technology including high voltage DC power generation. A typical electric power system architecture includes an un-regulated permanent magnet generator coupled to a boost type pulse width modulated power converter, such as an active rectifier, and a high voltage battery.

Multilevel topologies for achieving this system have been considered in order to achieve a low harmonic distortion with moderate switching frequency and reduced electromagnetic interference emissions compared to standard two-level active rectifiers/inverters. In some applications, the near constant power load over the duration of vehicle operating time from a base load can be coupled with high peak loads that occur periodically, or for brief durations during the operation of the vehicle. To support the peak load requirements, re-chargeable high energy storage batteries are included within the electric power system. Such systems, however, may require additional power dissipating resistors handling regenerative loads with fully charged batteries.

SUMMARY OF THE INVENTION

In one exemplary embodiment a power system architecture for a vehicle includes a source management unit including at least a generator, a first stored energy component, and a second stored energy component, a high voltage DC bus connecting a high voltage load to the source management unit, at least one low voltage DC bus connecting at least one low voltage DC load to the source management unit, the source management unit including a plurality of multi-functional power modules configured such that the source management unit includes a multi-level active rectifier connecting the generator to a multi-level DC bus, a first multi-level multi-function converter connecting the first stored energy component to the multi-level active rectifier, a second multi-level multi-function converter connecting the second stored energy component to a multi-level isolated DC bus, and an isolated multi-level DC-DC converter connecting the multi-level DC bus to the multi-level isolated DC bus.

Another example of the above described power system architecture for a vehicle further includes an AC bus connected to the source management unit, and configured to connect to a ground based AC power source, the AC bus further configured to supply AC power to at least one load.

In another example of any of the above described power system architectures for a vehicle the at least one load includes a traction motor and a motor driven load.

In another example of any of the above described power system architectures for a vehicle the at least one load is connected to the AC bus by at least one of a matrix converter and a switch.

In another example of any of the above described power system architectures for a vehicle each of the multi-functional power modules further includes a DC output connected to a multi-level rectifier, a multi-function DC-DC converter connecting the multi-level rectifier to an isolated DC-DC converter, and connected to the first energy storage component, and an output of the isolated DC-DC converter is connected to a multilevel inverter section, a multi-function DC-DC converter, and at least one DC bus output, the multifunction DC-DC converter being further connected to the second stored energy component.

In another example of any of the above described power system architectures for a vehicle each of the multilevel inverter sections comprises a capacitor in parallel with a half bridge.

In another example of any of the above described power system architectures for a vehicle each of the multilevel inverter sections comprises a capacitor in parallel with an H-bridge, and the H-bridge includes an AC bus connection.

In another example of any of the above described power system architectures for a vehicle each of the multi-functional power modules further includes a DC output connected to a multi-level rectifier, a multi-function DC-DC converter connecting the multi-level rectifier to an isolated DC-DC converter, and connected to the first energy storage component, and an output of the isolated DC-DC converter is connected to a multi-function DC-DC converter and a DC output bus.

In another example of any of the above described power system architectures for a vehicle the generator is configured as a three phase y-generator and each phase has a shared neutral node.

In another example of any of the above described power system architectures for a vehicle the generator is configured as a flux regulated three-phase generator.

In another example of any of the above described power system architectures for a vehicle at least one low voltage DC bus includes a plurality of low voltage DC busses, with each low voltage DC bus having a similar voltage level.

In another example of any of the above described power system architectures for a vehicle a voltage of the high voltage DC bus is at least 600 Volts, and a voltage of the low voltage DC bus is at most 270 Volts.

In another example of any of the above described power system architectures for a vehicle each multi-functional power module is approximately identical to each other multi-functional power module.

An exemplary method for providing electric power to a vehicle includes providing power to a first DC bus, at least one second DC bus and an AC bus using a source management unit including a generator, and at least a first and second energy storage component, wherein the source management unit a plurality of multi-functional power modules configured such that the source management unit includes a multi-level active rectifier connecting the generator to a multi-level DC bus, a first multi-level multi-function converter connecting the first stored energy component to the multi-level active rectifier, a second multi-level multi-function converter connecting the second stored energy component to a multi-level isolated DC bus, and an isolated multi-level DC-DC converter connecting the multi-level DC bus to the multi-level isolated DC bus.

Another example of the above described exemplary method for providing electric power to a vehicle further includes providing a first DC voltage to the first DC bus, and at least one second DC voltage to the second DC bus, wherein the DC voltage of the second DC bus is lower than the DC voltage of the first DC bus.

Another example of any of the above described exemplary methods for providing electric power to a vehicle further includes receiving power from a connection to a ground based power grid via the AC bus.

Another example of any of the above described exemplary methods for providing electric power to a vehicle further includes receiving regenerative power from at least one load electrically coupled to the AC bus.

In another example of any of the above described exemplary methods for providing electric power to a vehicle providing power to at least one second DC bus, comprises providing power to a plurality of second DC buses, each of the second DC busses having a distinct voltage level.

These and other features of the present invention can be best understood from the following specification and drawings, the following of which is a brief description.

DETAILED DESCRIPTION OF AN EMBODIMENT

Figure 1:
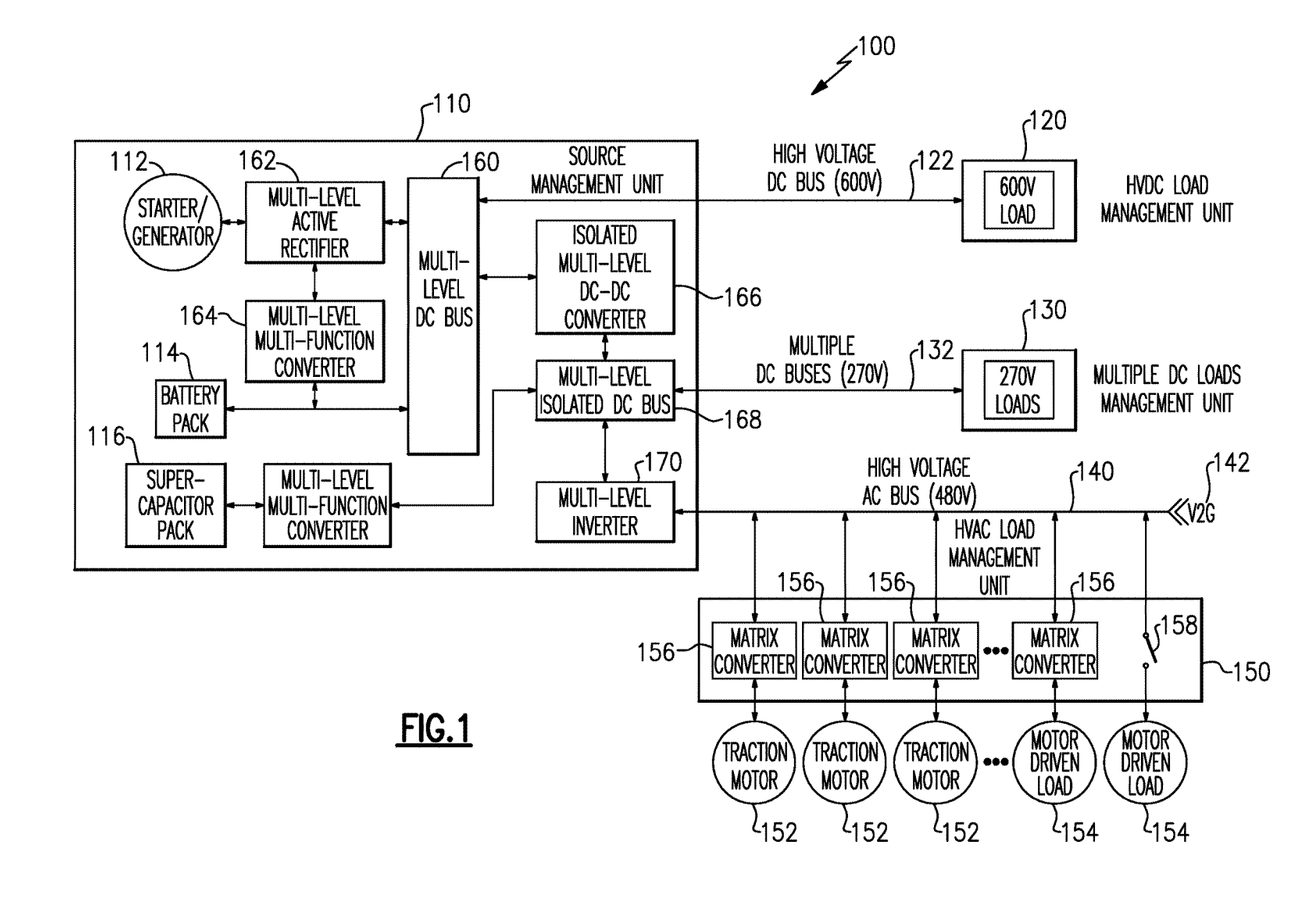
FIG. 1 schematically illustrates an exemplary modular electric power system for a vehicle including both AC and DC power distribution.

FIG. 1 schematically illustrates an exemplary electric power system 100 for utilization in a vehicle, such as a military vehicle. The electric power system 100 provides multiple levels of DC power to various loads 120, 130, as well as providing AC power to multiple AC loads 152, 154, and is controlled by a general vehicle controller.

The electric power system 100 includes a source management unit 110 that controls the distribution of power from multiple power sources 112, 114, 116 to multiple loads 120, 130, 152, 154. The source management unit 110 is connected to a high voltage DC load 120 via a high voltage DC bus 122, which provides power to one or more corresponding load. The source management unit 110 is also connected to one or more low voltage DC loads 130 via one or more low voltage DC busses 132. While illustrated herein as a single load 130 connected to the source management unit 110 via a single bus 132 for simplicity, each of the loads 130 is connected to the source management unit 110 via a distinct bus 132.

Also connected to the source management unit 110 is a high voltage AC bus 140. The AC bus 140, in some examples, is configured to connect to a ground based voltage source 142 such as a power grid. The high voltage AC bus 140 provides power to multiple traction motors 152 and motor driven loads 154 through a high voltage AC load management unit 150. In alternative examples, any other AC driven load can be utilized in place of, or in addition to, the illustrated loads 152, 154. The high voltage AC load management unit 150 includes multiple converters 156 and switches 158 that control the provision of power from the AC bus 140 to the various connected loads 152, 154 and vice versa. In some examples, one or more of the loads 152, 154 is regenerative and provides power back to the source management unit 110 through the AC bus 140 during some modes of operation.

The source management unit 110 includes multiple power sources such as a starter/generator 112, a battery pack including one or more batteries 114, and a supercapacitor 116. In alternative examples, any other power source can be utilized instead of, or in addition to, the illustrated power sources 112, 114, 116.

The starter/generator 112 is connected to a multi-level DC bus 160 via a multi-level active rectifier 162. The battery 114 is also connected to the multi-level DC bus 160, and connected to the multi-level active rectifier 162 via a multi-level multi-function converter 164. Through these connections, the source management unit 110 controls the power provided from the starter/generator 112 and the battery pack 114 to the high voltage DC bus 122, and thus to the high voltage load 120.

In order to provide power from the multi-level DC bus 160 to the low voltage DC busses 132, which is at a lower voltage than the high voltage DC bus 122, the low voltage DC bus 132 is connected to the multi-level DC bus 160 through an isolated Multi-level DC-DC converter 166 that adjusts the voltage output from the multi-level DC bus. The isolated multi-level DC-DC converter 166 in turn provides the power to a multi-level isolated DC bus 168 that feeds each of the multiple low voltage DC busses 132. The high voltage AC bus 140 is connected to the multi-level isolated DC bus 168 via a multi-level inverter 170.

The preceding architecture is constructed of multiple substantially identical multi-function power modules. As used herein, "substantially identical" refers to the electrical circuits contained within the multi-function power modules, and one of skill in the art will understand that the physical arrangement of the circuits, as well as the housings containing the circuits, can be varied. Further, the utilization of multiple substantially identical modules allows the source management unit 110 to be scaled and adjusted for varied requirements without an extensive overhaul to the underlying system or controls.

Figure 2:
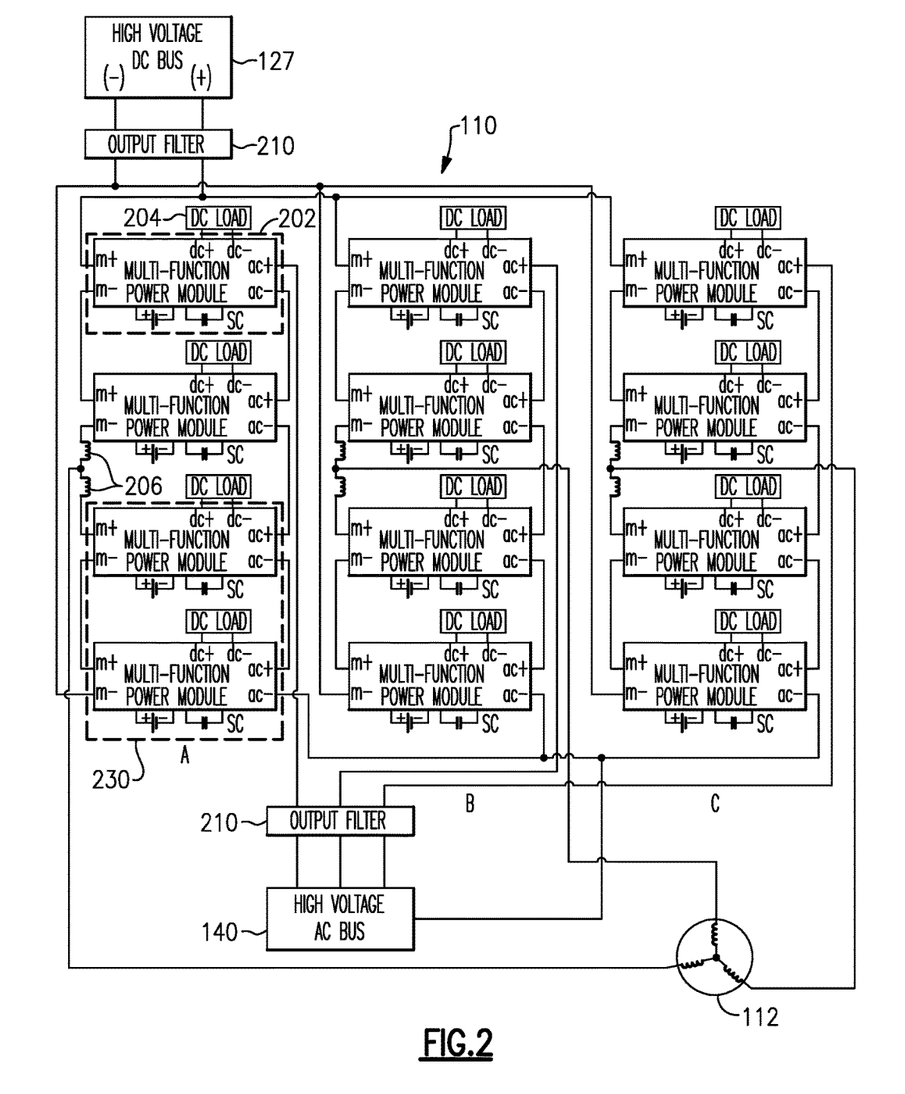
FIG. 2 schematically illustrates a first example source management unit for the electric power system of FIG. 1.

With continued reference to FIG. 1, and with like numerals indicating like elements, FIG. 2 schematically illustrates an exemplary arrangement of multi-function power modules 202 arranged to create the source management unit 110 illustrated in FIG. 1. Each of the multiple multi-function power modules 202 provides an output to a DC load 204, such as the low voltage DC load 130 of FIG. 1. The power modules 202 are arranged in phases A, B, C, with each phase A, B, C including two phase arms 230, resulting in a total of six phase arms 230. Each phase arm 230 is connected to a three phase permanent magnet generator 112 via interface inductors 206.

Each phase A, B, C is further connected to the high voltage DC bus 122 through an output filter 210 that is directly, or indirectly, connected to a DC output of each power module 202. The cascaded connection to the DC output of each power module results in the total DC output achieving a high voltage, relative to the voltage at the DC load 204 connected to each module. Each power module 202 also includes an AC output. The AC outputs are connected in a chain configuration, with the last power module 202 in each phase A, B, C being connected to the high voltage AC bus via a second output filter 212.

Figure 3:
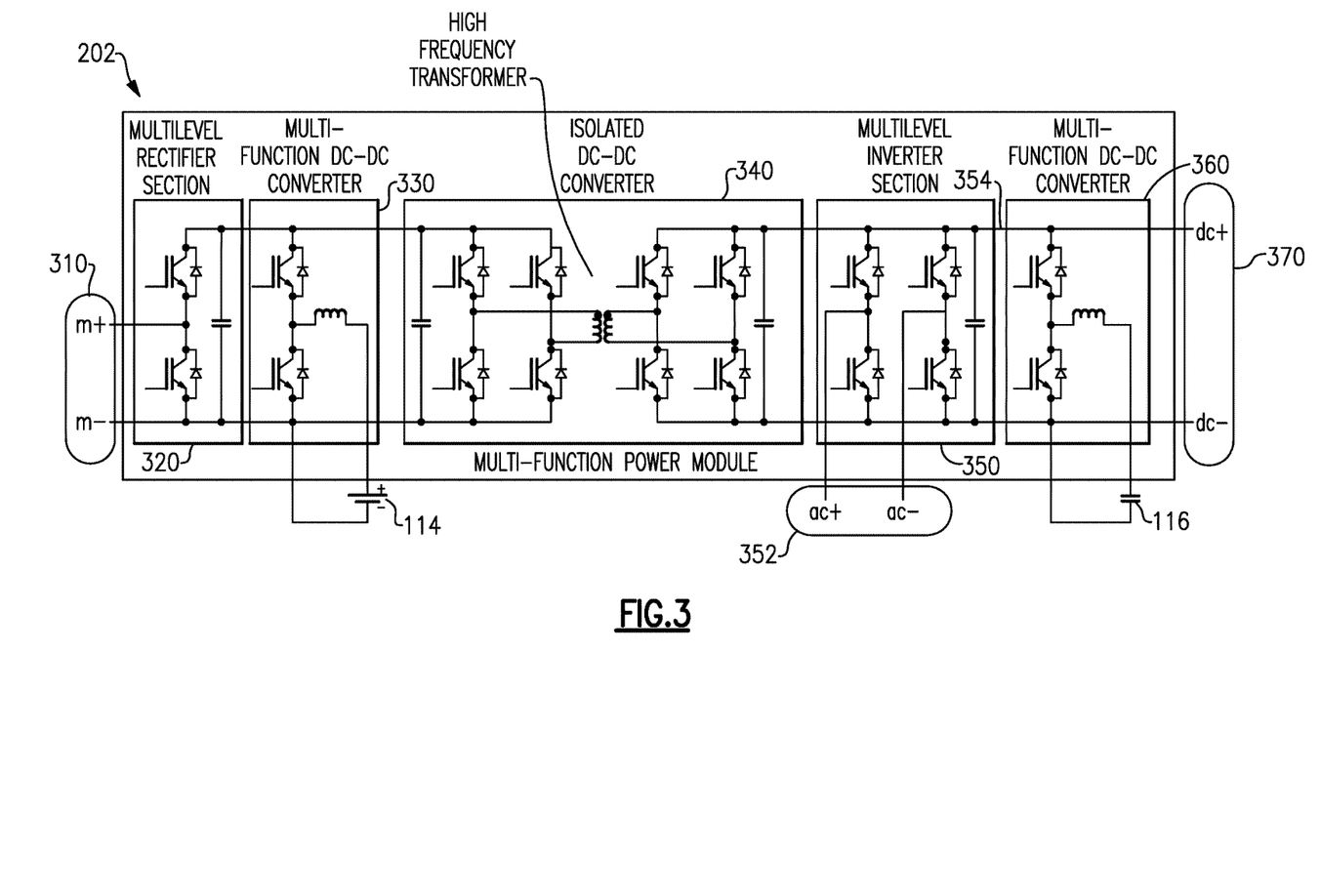
FIG. 3 schematically illustrates an exemplary multi-function power module for utilization in conjunction with the examples of FIGS. 1 and 2.

With continued reference to FIGS. 1 and 2, FIG. 3 schematically illustrates an exemplary multi-function power module 202, for utilization in the source management unit 110 of FIG. 2. The multi-function power module 202 includes a DC input/output 310 connected to a multi-level rectifier section 320. The multi-level rectifier section 320 is a half bridge configuration with a parallel capacitor. Connected to an output of the multilevel rectifier section 320 is a multi-function DC-DC converter 330 that receives power from the battery 114 and adjusts the voltage on a non-isolated DC bus or charges the battery 114.

The combined power from the DC input/output 310 and the battery 114 is then provided to an isolated DC-DC converter 340, that provides a DC voltage output that is electrically isolated from the input. The output of the isolated DC-DC converter 340 is provided to a multilevel inverter section 350. The multi-level inverter section 350 generates an AC output 352 and a DC output 354.

The DC output 354 is provided to a second multi-function DC-DC converter 360. The second multi-function DC-DC converter 360 includes another input connected to the super capacitor 116, and regulates voltage on the isolated DC bus or charges the supercapacitor of the multi-function power module 202.

Figure 4:
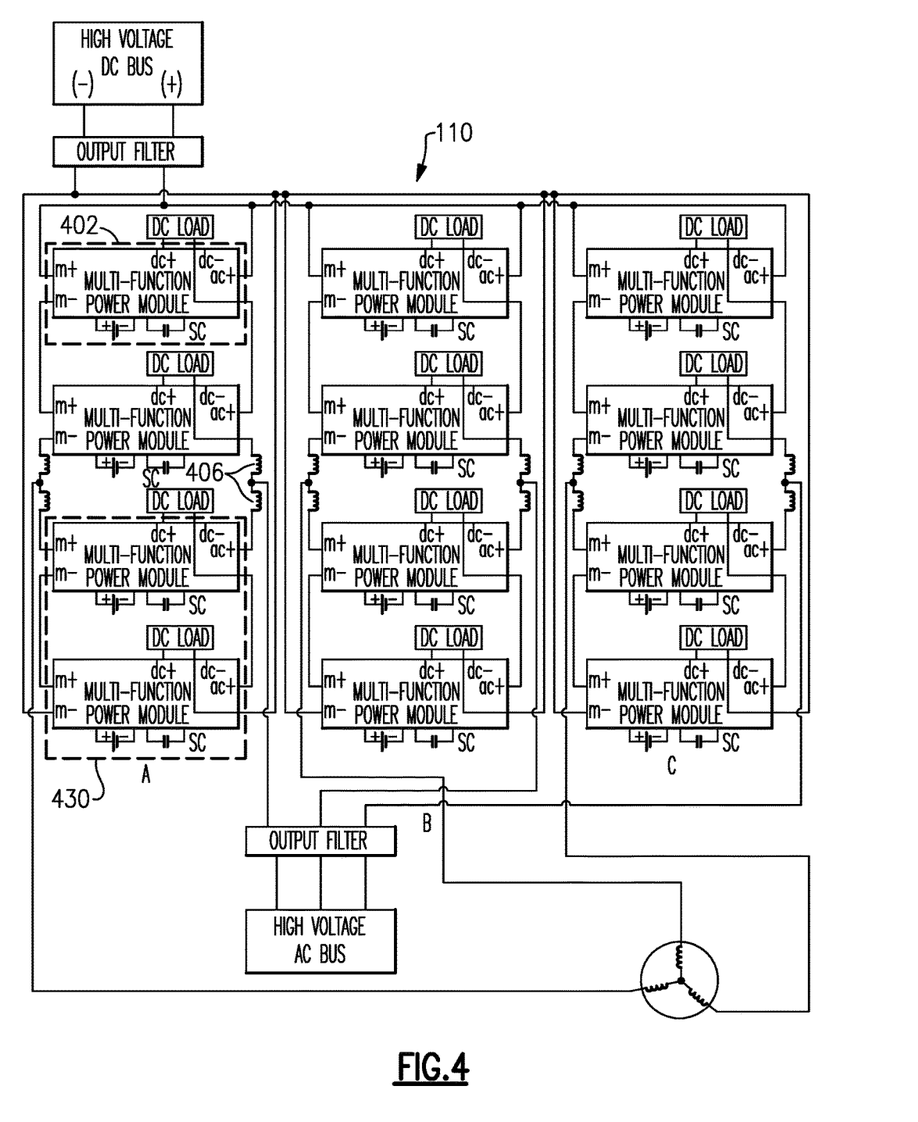
FIG. 4 schematically illustrates a second example source management unit for the electric power system of FIG. 1

With continued reference to FIG. 1, and with like numerals indicating like elements, FIG. 4 schematically illustrates an alternate exemplary arrangement of multi-function power modules 402 arranged to create the source management unit 110 illustrated in FIG. 1. The source management unit 110 of FIG. 4 is arranged in a similar fashion to the source management unit of FIG. 2, with the addition of a second set of interface inductors 406 at each phase leg 430.

Figure 5:
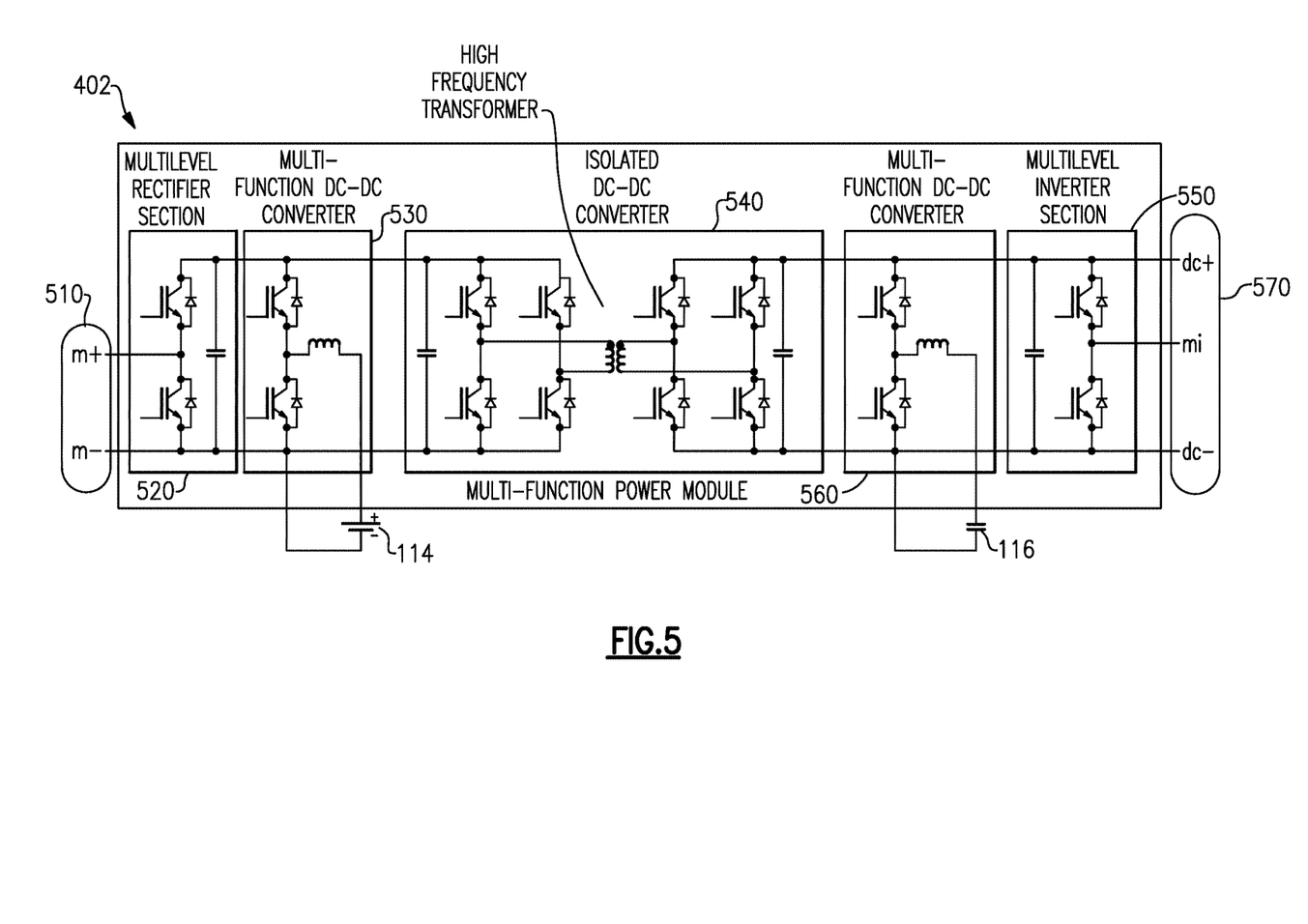
FIG. 5 schematically illustrates an exemplary multi-function power module for utilization in conjunction with the examples of FIGS. 1 and 4.

In order to accommodate the alternate example source management unit of FIG. 4, the multi-function power modules 402 are modified from the example multi-function power modules illustrated in FIG. 3. With continued reference to FIGS. 1 and 4, and with like numerals indicating like elements, FIG. 5 schematically illustrates a multi-function power module 402, such as can be utilized in the source management unit 110 of FIG. 4.

The multi-function power module 402 includes a DC input/output 510 connected to a multi-level rectifier section 520. The multi-level rectifier section 520 is a half bridge configuration with a parallel capacitor. Connected to an output of the multilevel rectifier section 520 is a multi-function DC-DC converter 530 that receives power from the battery 114 and adjusts the voltage on the non-isolated DC bus or charges the battery 114.

The combined power from the DC input/output 510 and the battery 114 is then passed to an isolated DC-DC converter 540. The isolated DC-DC converter 540 provides a DC voltage output that is electrically isolated from the input. The DC voltage output is provided to a second multi-function DC-DC converter 560, which adjusts the voltage on isolated DC bus or charges the supercapacitor 116. The isolated DC voltage is provide to the multi-level inverter section 550, which generates a corresponding multi-function power module 402 output 570.

As described above, each of the multi-function power modules 402 are configured as shown in FIG. 4, and controlled via a controller, to create the power system configuration of FIG. 1.

In some vehicles, AC power is not required. In such vehicles, the electric power system 100 omits the components and configurations designed to distribute AC power. However, due to the presence of a starter/generator power source within the source management unit, each of the multi-function power modules in such an example is configured to generate DC power at least partially from an AC source.

Figure 6:
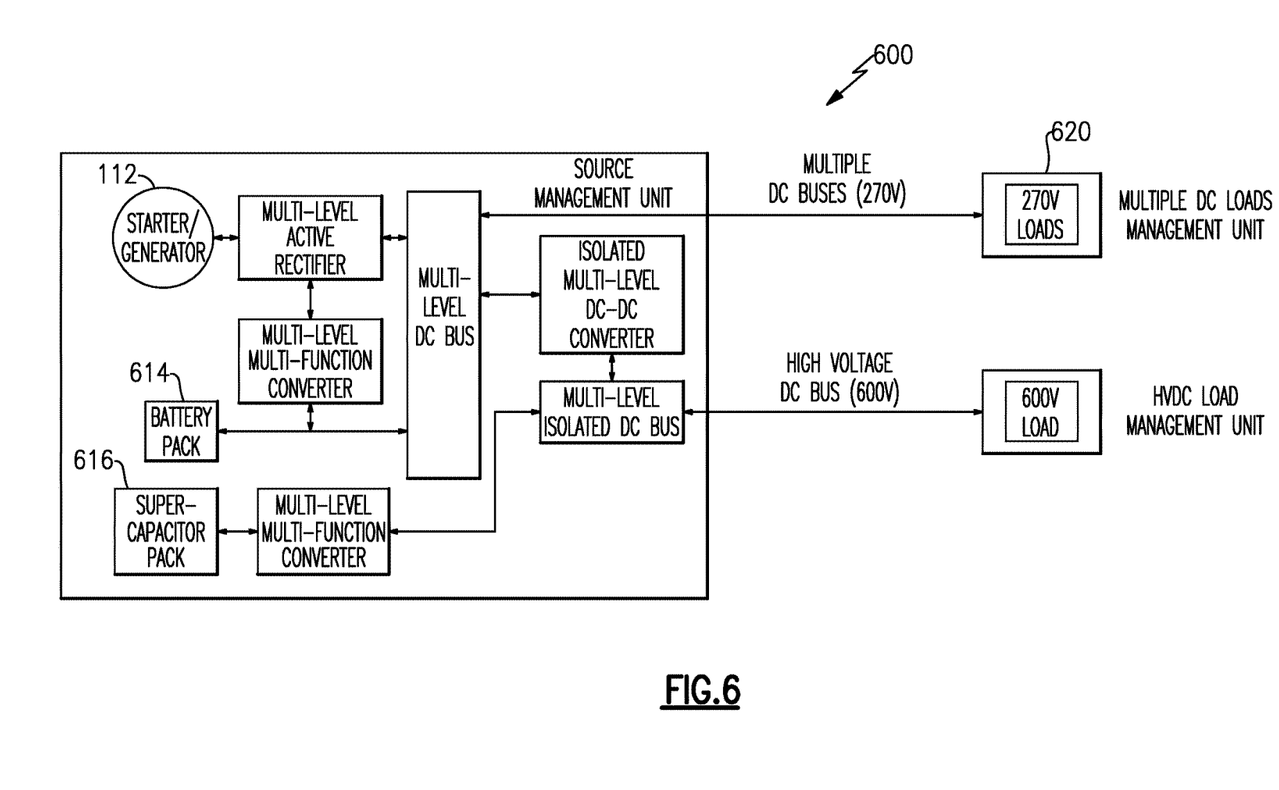
FIG. 6 schematically illustrates an alternate exemplary modular electric power system for a vehicle including only DC power distribution.

By way of example, FIG. 6 schematically illustrates an exemplary electric power system 600 for utilization in a vehicle, such as a military vehicle, where the vehicle only utilizes DC loads. Fundamentally, the electrical power system 600 includes the same components as the power system 100 of FIG. 1, with the omission of the multi-level inverter 170, the AC bus 140, and the AC loads 152, 154.

Figure 7:
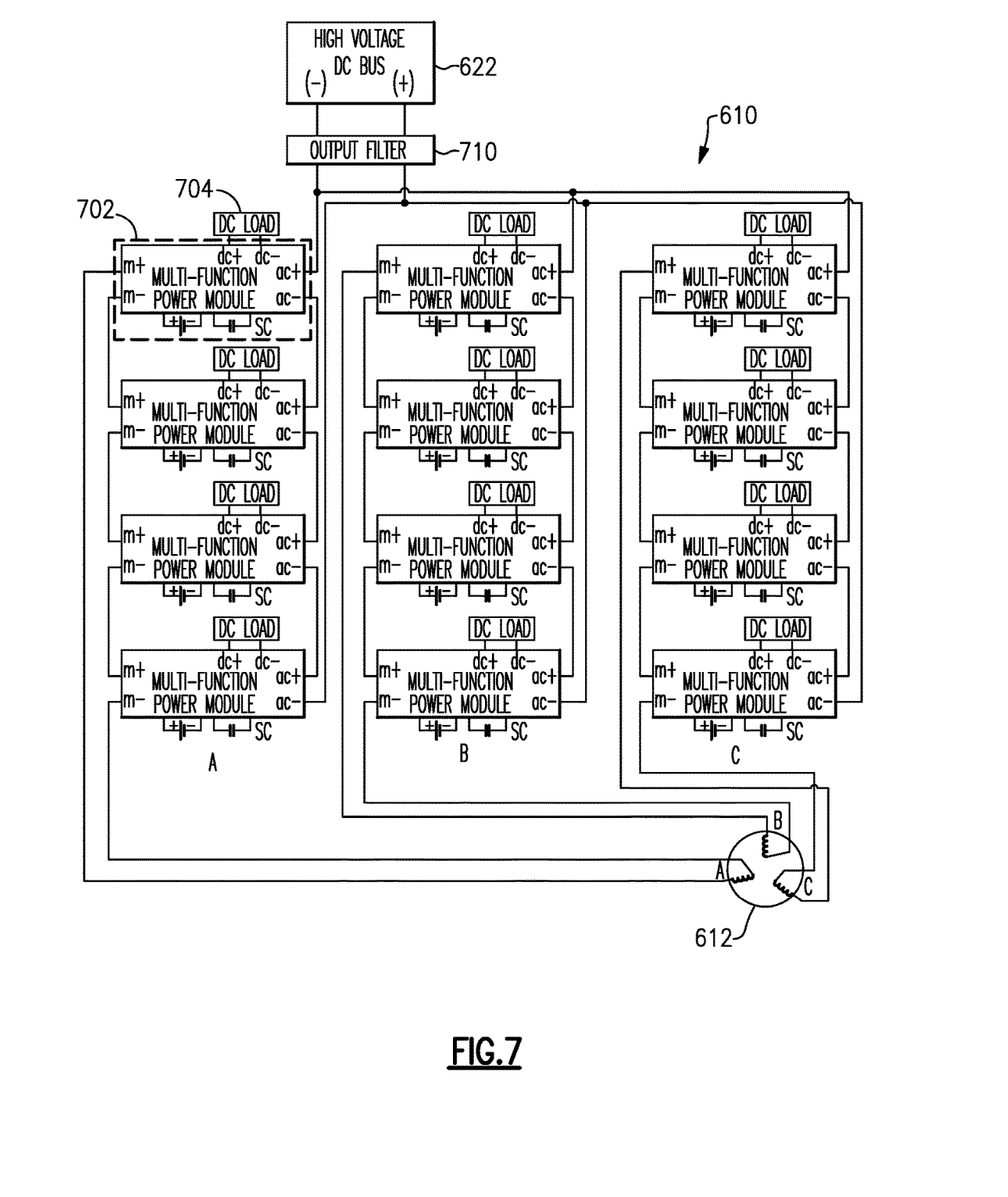
FIG. 7 schematically illustrates an exemplary source management unit for utilization with the modular electric power system of FIG. 6.

With continued reference to FIG. 6, FIG. 7 schematically illustrates a source management unit 610. Unlike the examples including AC distribution, the starter generator 612 is configured as three independent phases A, B, C without a joined neutral linking the phases A, B, C. As a result, each phase can be independently converted into DC and provide an output through an output filter 710 to the high voltage DC load through a high voltage DC bus 622. In some alternate examples, the starter/generator 612 can be controlled using a control coil powered by one or more of the low voltage DC busses.

Each phase of the starter/generator 612 is connected to a corresponding phase A, B, C of the source management unit 610. Each phase A, B, C of the source management unit 610 is constructed of multiple multi-function power modules 702. Within each phase A, B, C of the source management unit 610, the multi-function power modules 702 are chained together to provide multiple distinct low voltage DC outputs 704, and to combine to a single high voltage DC output provided to the output filter 710.

Figure 8:
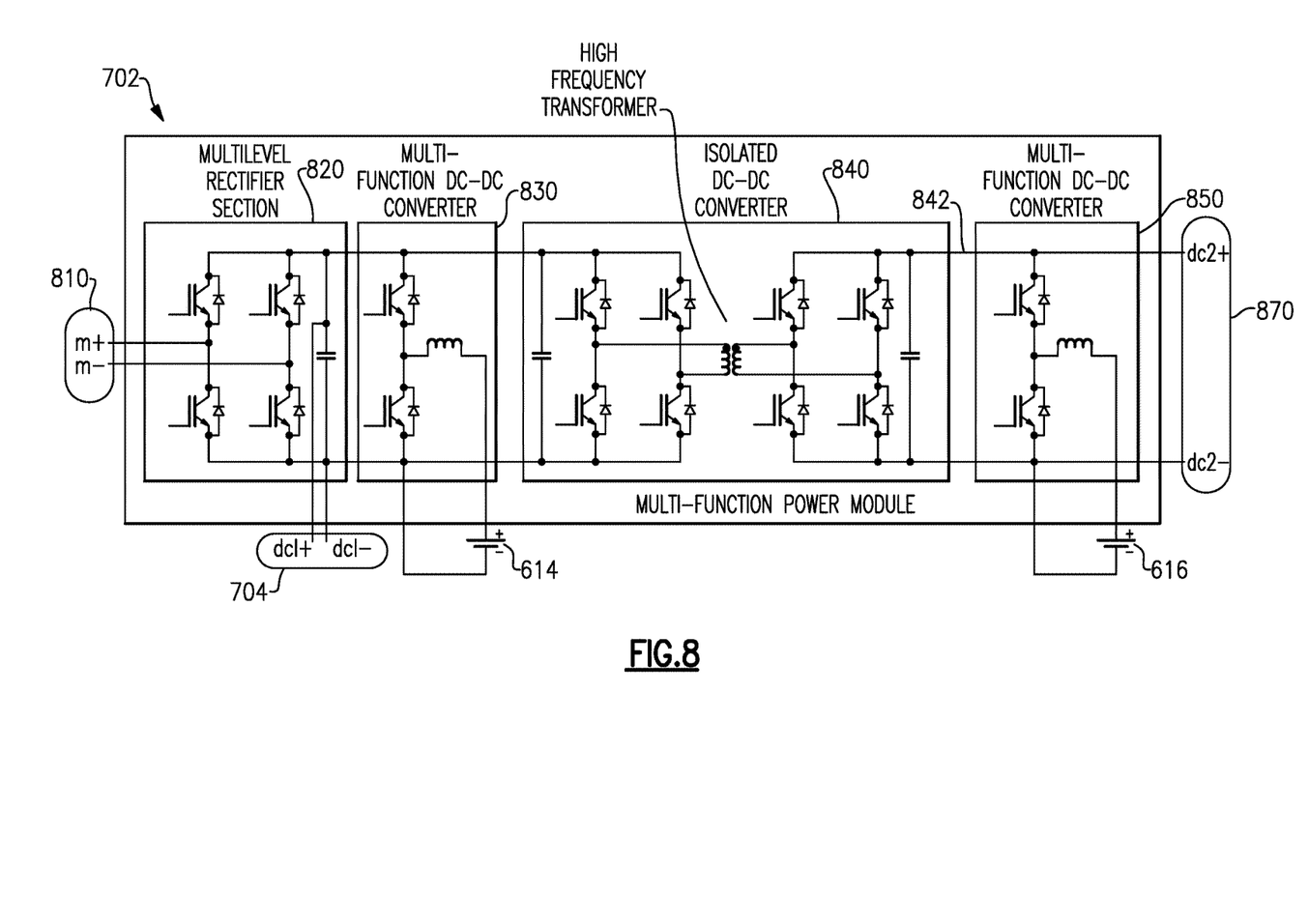
FIG. 8 schematically illustrates an exemplary multi-function power module of utilization with the examples of FIGS. 6 and 7.

With continued reference to FIGS. 6 and 7, FIG. 8 schematically illustrates an exemplary multi-function power module 702 in greater detail. Each multi-function power module 702 includes an AC input 810 that provides AC power to a multilevel rectifier 820. The multilevel rectifier 820 converts the AC input 810 into a DC output 704 that is provided to a corresponding low voltage DC bus, and to a multi-function DC-DC converter 830. The multi-function DC-DC converter 830 adjusts the voltage on the non-isolated DC bus or charges the battery.

The output of the multi-function DC-DC converter 830 is provided to an isolated DC-DC converter 840 which generates an electrically isolated DC output 842. The electrically isolated DC output 842 is provided to a second multi-function DC-DC converter 850 which adjusts the voltage on isolated DC bus or charges the supercapacitor 616.

The output of the second multi-function DC-DC converter 850 is a DC output 870 of the multi-function power module 702.

With reference now to all of FIGS. 1-8, the components within each of the multi-function power modules 202, 402, 702 are constructed using conventional H-bridges and half bridges including power transistors. A controller, such as a general purpose vehicle controller, can be configured by one of skill in the art to generate the configurations described above according to the specific needs of any given implementations.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A power system architecture for a vehicle comprising:
   a source management unit including at least a generator, a first stored energy component, and a second stored energy component;
   a high voltage DC bus connecting a high voltage load to said source management unit;
   at least one low voltage DC bus connecting at least one low voltage DC load to the source management unit;
   the source management unit including a plurality of multi-functional power modules configured such that the source management unit includes a multi-level active rectifier connecting the generator to a multi-level DC bus, a first multi-level multi-function converter connecting the first stored energy component to the multi-level active rectifier, a second multi-level multi-function converter connecting the second stored energy component to a multi-level isolated DC bus, and an isolated multi-level DC-DC converter connecting the multi-level DC bus to the multi-level isolated DC bus.

2. The power system of claim 1, further comprising an AC bus connected to the source management unit, and configured to connect to a ground based AC power source, the AC bus further configured to supply AC power to at least one load.

3. The power system of claim 2, wherein the at least one load includes a traction motor and a motor driven load.

4. The power system of claim 2, wherein the at least one load is connected to the AC bus by at least one of a matrix converter and a switch.

5. The power system of claim 2, wherein each of said multi-functional power modules further comprises:
   a DC output connected to a multi-level rectifier,
   a multi-function DC-DC converter connecting the multi-level rectifier to an isolated DC-DC converter, and connected to the first energy storage component; and
   an output of the isolated DC-DC converter is connected to a multilevel inverter section, a multi-function DC-DC converter, and at least one DC bus output, the multi-function DC-DC converter being further connected to the second stored energy component.

6. The power system of claim 5, wherein each of the multilevel inverter sections comprises a capacitor in parallel with a half bridge.

7. The power system of claim 5, wherein each of the multilevel inverter sections comprises a capacitor in parallel with an H-bridge, and the H-bridge includes an AC bus connection.

8. The power system of claim 1, wherein each of said multi-functional power modules further comprises:
   a DC output connected to a multi-level rectifier,
   a multi-function DC-DC converter connecting the multi-level rectifier to an isolated DC-DC converter, and connected to the first energy storage component; and
   an output of the isolated DC-DC converter is connected to a multi-function DC-DC converter and a DC output bus.

9. The power system of claim 1, wherein the generator is configured as a three phase y-generator and each phase has a shared neutral node.

10. The power system of claim 1, wherein the generator is configured as a flux regulated three-phase generator.

11. The power system of claim 1, wherein at least one low voltage DC bus includes a plurality of low voltage DC busses, with each low voltage DC bus having a similar voltage level.

12. The power system of claim 1, wherein a voltage of the high voltage DC bus is at least 600 Volts, and a voltage of the low voltage DC bus is at most 270 Volts.

13. The power system of claim 1, wherein each multi-functional power module is approximately identical to each other multi-functional power module.

14. A method for providing electric power to a vehicle comprising:
    providing power to a first DC bus, at least one second DC bus and an AC bus using a source management unit including a generator, and at least a first and second energy storage component, wherein the source management unit a plurality of multi-functional power modules configured such that the source management unit includes a multi-level active rectifier connecting the generator to a multi-level DC bus, a first multi-level multi-function converter connecting the first stored energy component to the multi-level active rectifier, a second multi-level multi-function converter connecting the second stored energy component to a multi-level isolated DC bus, and an isolated multi-level DC-DC converter connecting the multi-level DC bus to the multi-level isolated DC bus.

15. The method of claim 14, further comprising providing a first DC voltage to said first DC bus, and at least one second DC voltage to said second DC bus, wherein the DC voltage of the second DC bus is lower than the DC voltage of the first DC bus.

16. The method of claim 14, further comprising receiving power from a connection to a ground based power grid via said AC bus.

17. The method of claim 14, further comprising receiving regenerative power from at least one load electrically coupled to the AC bus.

18. The method of claim 14, wherein providing power to at least one second DC bus, comprises providing power to a plurality of second DC buses, each of said second DC busses having a distinct voltage level.